US009501936B2

(12) United States Patent
Trefilova et al.

(10) Patent No.: US 9,501,936 B2
(45) Date of Patent: Nov. 22, 2016

(54) AIRCRAFT SYSTEMS AND METHODS FOR DISPLAYING SPACING INFORMATION

(71) Applicant: HONEYWELL INTERNATIONAL INC., Morristown, NJ (US)

(72) Inventors: Helena Trefilova, Jihomoravsky kraj (CZ); Petr Casek, Jihomoravsky kraj (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/475,067

(22) Filed: Sep. 2, 2014

(65) Prior Publication Data

US 2016/0063866 A1   Mar. 3, 2016

(51) Int. Cl.

| | |
|---|---|
| *G01C 21/00* | (2006.01) |
| *G01C 23/00* | (2006.01) |
| *G08G 5/00* | (2006.01) |
| *B64D 45/00* | (2006.01) |
| *G08G 5/02* | (2006.01) |
| *G01S 13/93* | (2006.01) |

(52) U.S. Cl.
CPC ............. *G08G 5/0004* (2013.01); *B64D 45/00* (2013.01); *G01S 13/9303* (2013.01); *G08G 5/0008* (2013.01); *G08G 5/0013* (2013.01); *G08G 5/0021* (2013.01); *G08G 5/0078* (2013.01); *G08G 5/025* (2013.01); *G08G 5/0052* (2013.01)

(58) Field of Classification Search
CPC .. G08G 5/0008; G08G 5/025; G08G 5/0078; G01C 23/00; G01S 13/9303
USPC .................... 340/945, 961, 963; 701/120, 14
See application file for complete search history.

(56) References Cited

U.S. PATENT DOCUMENTS

| | | | | |
|---|---|---|---|---|
| 6,690,296 B2* | 2/2004 | Corwin | ............... | G01S 13/9303 340/945 |
| 6,885,313 B2* | 4/2005 | Selk, II | .................. | G01C 23/00 340/945 |
| 8,040,259 B2* | 10/2011 | Glover | ................. | G08G 5/0008 340/961 |
| 8,188,889 B2* | 5/2012 | Shafaat | ............... | G08G 5/0078 340/945 |
| 8,249,762 B1* | 8/2012 | Flotte | ........................ | G01S 7/41 701/9 |
| 8,417,396 B2 | 4/2013 | Goodman et al. | | |
| 8,566,012 B1 | 10/2013 | Shafaat et al. | | |
| 2003/0200024 A1* | 10/2003 | Poreda | ................... | G08G 5/025 701/120 |
| 2011/0169665 A1* | 7/2011 | Palanisamy | ............ | G01C 23/00 340/961 |

(Continued)

OTHER PUBLICATIONS

NASA; NASA Technology Could Help Decrease Air Traffic Delays [Retrieved from inter net: http://www.nasa.gov/centers/langley/news/factsheets/FS-2004-02-83-LaRC_prt.htm] Feb. 2004.
Stassen, et al. Multi-Purpose Cockpit Display of Traffic Information: Overview and Development of Performance Requirements; The MITRE Corporation, American Institute of Aeronautics and astronautics, 2010.

(Continued)

*Primary Examiner* — John A Tweel, Jr.
(74) *Attorney, Agent, or Firm* — Lorenz & Kopf, LLP (57) ABSTRACT

A display system for a subject aircraft is provided. The system includes a processing unit configured to receive air traffic spacing information associated with a lead aircraft and flight information associated with the subject aircraft and to generate display signals associated with the air traffic spacing information and the flight information; and a display unit coupled to the processing unit and configured to receive the display signals from the processing unit and to render a horizontal situation indicator with spacing symbology based on the air traffic spacing information and the flight information.

12 Claims, 3 Drawing Sheets

(56) References Cited

U.S. PATENT DOCUMENTS

2012/0035842 A1    2/2012  Shafaat et al.
2015/0120177 A1*   4/2015  Palanisamy .......... G08G 5/0021
                                                      701/120

OTHER PUBLICATIONS

Extended EP search report for Application No. 15181878.8-1803/2993655 dated Dec. 2, 2016.

* cited by examiner

AIRCRAFT SYSTEMS AND METHODS FOR DISPLAYING SPACING INFORMATION

TECHNICAL FIELD

The present invention generally relates to aircraft display systems and methods, and more particularly relates to aircraft systems and methods for presenting air traffic spacing information.

BACKGROUND

Modern air traffic is increasing, and attempts at more efficiently managing the traffic are being implemented. In some areas, particularly when approaching airports, aircraft are presented with directions for achieving or maintaining a designated spacing between lead and trailing aircraft. However, efforts to efficiently and effectively present this information to the pilot may be challenging. The pilot is already presented with numerous types of information to manage various aspects of flight.

Accordingly, it is desirable to provide improved visual display systems and methods for providing air traffic spacing information in an intuitive and effective manner. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a display system for a subject aircraft is provided. The system includes a processing unit configured to receive air traffic spacing information associated with a lead aircraft and flight information associated with the subject aircraft and to generate display signals associated with the air traffic spacing information and the flight information; and a display unit coupled to the processing unit and configured to receive the display signals from the processing unit and to render a horizontal situation indicator with spacing symbology based on the air traffic spacing information and the flight information.

In accordance with another exemplary embodiment, a method is provided for displaying air traffic spacing information for a subject aircraft. The method includes receiving the air traffic spacing information, the air traffic spacing information being associated with a lead aircraft relative to the subject aircraft and including a spacing designation and a lead current position of the lead aircraft; comparing the lead current position of the lead aircraft to a subject current position of the subject aircraft to determine a spacing status; comparing the spacing status to the spacing designation to determine a spacing performance; and generating a horizontal situation indicator on a display device, the horizontal situation indicator including spacing symbology representing the spacing performance

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein provide improved aircraft systems and methods for displaying spacing information to a pilot. In particular, spacing symbology may be presented on a horizontal situation indicator (HSI) display to indicate the current spacing performance of the aircraft relative to a lead aircraft. The symbology may include a linear scale with an indication showing the current spacing performance relative to a spacing designation.

Figure 1:
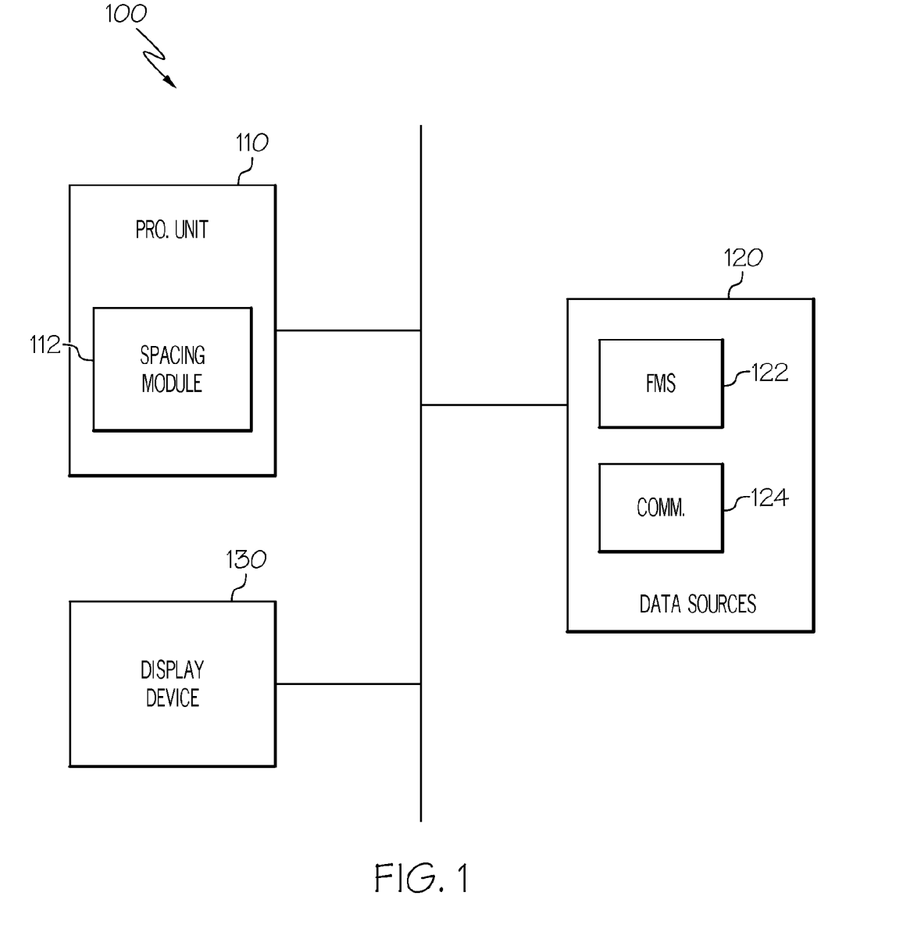
FIG. 1 is a block diagram of an aircraft system according to an exemplary embodiment.

FIG. 1 is a block diagram of an aircraft system 100 for displaying symbology associated with air traffic spacing, which may also be referred to as interval management. It should be understood that FIG. 1 is a simplified representation of the system 100 for purposes of explanation and ease of description. Further exemplary embodiments of the system 100 may include additional, other devices and components for providing further functions and features. Typically, the system 100 is implemented on an aircraft, although certain components may be off-board the aircraft. Moreover, although the discussion below references the system 100 in the context of aircraft, exemplary embodiments are also applicable to spacecraft, ships, submarines, and the like. As described below, in one exemplary embodiment, the aircraft system 100 may function to generate a horizontal situation indicator (HSI) that presents spacing symbology to a user as part of the status of the aircraft.

As an introduction, modern air traffic control systems are implementing airborne spacing operational concept, e.g., through flight deck interval management applications (ASPA-FIM). Such applications function to manage traffic flows and aircraft spacing, particularly during the approach or landing phase of flight at an airport, although the spacing information may also be applicable to other phases of flight. Generally, spacing information may refer to a required, assigned or requested spacing to be achieved and maintained by a trailing aircraft relative to a lead aircraft. For a particular aircraft, this spacing information may be referenced below as a spacing designation or goal. The exemplary embodiments discussed herein are typically presented from the perspective of the trailing aircraft (also referenced below as a "subject aircraft" or simply "aircraft"). Such spacing designations may be provided by air traffic control or the lead aircraft or determined according to predetermined protocols or requirements.

In practice, the spacing designation may be expressed as a geographic distance to be maintained from the lead aircraft or expressed as a time spacing from the lead aircraft. The time spacing may be defined as a time duration for the subject aircraft to fly directly to a current geographic location of the lead aircraft, typically with consideration of a predetermined set of parameters. The predetermined set of parameters may include, but is not necessarily limited to, a current airspeed of the subject aircraft, an estimated wind speed and wind direction relative to a flight path, and the vertical profile of the subject aircraft to the current geographic location of the lead aircraft. Accordingly, the spacing between aircraft may be determined by distance between the aircraft, travel time between aircraft, or both. In association with these programs, exemplary embodiments of the aircraft system 100 may be implemented to present various types of information associated with this spacing information to the pilot (or user) in each aircraft in a more convenient and effective manner, discussed below after a general description of the associated system 100.

As shown, the system 100 includes processing unit 110, one or more data sources 120, and a display device 130 coupled together in any suitable manner, such with as a data bus. Although the system 100 appears in FIG. 1 to be arranged as an integrated system, the system 100 is not so limited and may also include an arrangement whereby one or more of the processing unit 110, data sources 120, and display device 130 are separate components or subcomponents of another system located either onboard or external to the aircraft.

Although not shown, the system 100 may include a user interface coupled to the processing unit 110, the data sources 120, and/or display device 130 to allow a user to interact with the system 100. Any suitable type or form of user interface may be provided, including a keypad, touchscreen, touchpad, keyboard, mouse, touch panel, joystick, knob, line select key and the like. Each component of the system 100 is introduced below prior to a more detailed description of particular features.

The processing unit 110 is coupled to the data sources 120 and display device 130 and generally represents the hardware, software, and/or firmware components configured to carry out the functions described below. Depending on the embodiment, the processing unit 110 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof. In practice, the processing unit 110 includes processing logic that may be configured to carry out the functions, techniques, and processing tasks associated with the operation of the system 100. As an example, the processing logic may be instructions stored in memory that may be executed by the processing unit 110. As described below, the processing unit 110 is generally configured to render a horizontal situation indicator (HSI) with spacing symbology on the display device 130 based on data from the data sources 120.

The processing unit 110 may include or otherwise receive data from a spacing module 112. The spacing module 112 may be embodied as hardware, software, and/or firmware components, such as those described above, and may particularly include the processing logic and/or memory components to carry out at least a portion of the functions associated with generating the spacing symbology discussed below. Such processing logic may include, as examples, algorithms, tables, and models. In one exemplary embodiment, the spacing module 112 may be configured to receive spacing information, receive information regarding operation of the subject aircraft, determining spacing status performance of the subject aircraft relative to the lead aircraft and spacing designations, and updating the spacing performance based on, for example, updated spacing information and updated relative operation of the lead and subject aircraft. Each of these aspects will be discussed in greater detail below.

Generally, the data sources 120 may be any type of data source suitable to carry out the functions described herein, including one or more databases, sensors, or portions of other systems. It is noted that, although these data sources 120 are, for clarity and convenience, shown as being stored separate from the processing unit 110, all or portions of these data sources 120 may be loaded into memory or integrally formed as part of the processing unit 110. As examples and without limitation, the data sources 120 include a flight management system (FMS) 122 and a communication system 124. Each data source 120 is briefly described below Generally, the FMS 122 supports navigation, flight planning, and other aircraft control functions and provides real-time data and/or information regarding the operational status of the aircraft. The FMS 122 may include or otherwise access one or more of the following: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag, and/or another suitable avionics system. As examples, the FMS 122 may identify engine operation and current aircraft configuration status, including information such as the current flap configuration, engine revolutions per minute, aircraft speed, aircraft pitch, aircraft yaw, aircraft roll, fuel flow, fuel quantity, fuel remaining, and the like. Additionally, the FMS 122 may identify or otherwise determine environmental conditions at or near the current location of the aircraft, such as, for example, the current temperature, wind speed, wind direction, atmospheric pressure, turbulence, and the like. The FMS 122 may also identify optimized speeds, distance remaining, time remaining, cross track deviation, navigational performance parameters, and other travel parameters.

With respect to navigation data, the FMS 122 may further determine the current and future estimates of position (horizontal and vertical), velocity, and flight direction (e.g., heading, course, track, etc.), and other relevant flight information, including flight planning information such as terrain, waypoint, and airport. Accordingly, the FMS 122 may include or access data from any suitable position and direction determination devices that are capable of providing the information described above. As examples, the FMS 122 may include a Global Positioning System (GPS) and/or an Inertial Reference System (IRS). The FMS 122 may also include and/or receive data from sources such as air data, AHRS, VORs, DMEs, TACANs, MLS, ILS, LORAN-C, and ADF. As described below, the FMS 122 provides operation and position information to the processing unit 110 to generate the HSI with spacing symbology.

In general, the communication system 124 may be any type of transceiver system for sending and receiving information between the system 100 (e.g., on an aircraft of a user), air traffic control, other aircraft, and/or other relevant parties. In this regard, the communication system 124 may be realized using a radio communication system or another suitable data link system. In some exemplary embodiments, the communication system 124 may be incorporated into the FMS 122. With the communication system 124, the system 100 may provide location, altitude, and other flight data to the relevant parties and receive similar information. As an example, the communication system 124 may receive position information for aircraft in the vicinity and spacing information from air traffic control, other aircraft, and/or other sources. The communication system 124 may be part of and/or be associated with an Automatic Dependent Surveillance-Broadcast (ADS-B) type system or similar technology. ADS-B is a cooperative surveillance technique or technology for air traffic control and related applications for automatically ascertaining and exchanging position and other relevant information, such as altitude, airspeed, heading, vertical trend, etc. This information may be used to achieve and maintain spacing between aircraft, as well as to present the spacing symbology discussed below.

The display device 130 is realized as an electronic display configured to graphically display flight information or other data associated with operation of the aircraft. The display device 130 is used to display various images and data, in a graphic, iconic, and a textual format, and to supply visual feedback to the user. It will be appreciated that the display device 130 may be implemented using any one of numerous known displays suitable for rendering graphic, iconic, and/or text data in a format viewable by the user. Non-limiting examples of such displays include various cathode ray tube (CRT) displays, and various flat panel displays, such as various types of LCD (liquid crystal display) and TFT (thin film transistor) displays. As implemented, the display device 130 may be a panel mounted display, a HUD (head-up display) projection, or any one of numerous technologies and configured as any one of numerous types of aircraft flight deck displays, including a primary flight display (PFD) or a vertical situation indicator. In the depicted embodiments below, however, the display device 130 is configured as an HSI and particularly renders the spacing symbology discussed below.

As noted above, the system 100 may operate to generate an HSI on the display device 130. In this regard, the processing unit 110 may receive various types of flight and operating information and generate display signals for the display device 130 to render this information for the pilot. As will now be described, the information presented on the HSI includes spacing information.

Generally, the spacing operation of system 100 described below may be continuously active or selectively active upon a predetermined event (e.g., upon receiving appropriate spacing information or in a particular geographic or flight scenario) or upon activation by the pilot. During operation, the spacing module 112 of the processing unit 110 receives information regarding spacing, traffic, and/or interval management via the communication system 124. This information may include, as examples, the identity of the lead aircraft, a spacing designation (e.g., a target and tolerances), and/or position information regarding the lead aircraft. As also noted above, this information may come from, as an example, air traffic control. The spacing module 112 further receives flight information from the FMS 122 regarding the current state of the aircraft, e.g., the current position and speed of the aircraft. With information regarding the relative positions, the spacing module 112 may determine the current spacing status and performance with respect to the lead aircraft and the subject aircraft. As noted above, determining the spacing status may include determining a distance between a geographic location of the lead aircraft and a geographic location of the subject aircraft and/or determining a flying time from a current geographic location of the subject aircraft to a current geographic location of the lead aircraft. The spacing module 112 evaluates the spacing status relative to the spacing designation to determine the aircraft performance, e.g., to determine whether or not current operation of the aircraft is complying with the spacing designation. The processing unit 110 generates display signals representing spacing symbology that embodies the performance and/or status of the aircraft relative to the spacing designation. The spacing information (e.g., spacing designation and spacing status) may be continuously tracked and updated such that the spacing symbology presented to the pilot may also be continuously updated on the display device 130 to achieve and maintain the spacing designation.

In some embodiments, the spacing module 112 may additionally consider the context of the performance, such as relative to previous performance evaluations and/or spacing statuses. As an example, the aircraft may be operating in an "achieving phase" in which the system 100 initially receives the spacing designation and lead aircraft information, and although the subject aircraft is not yet complying with the spacing designation, the aircraft is expected to attempt compliance. Subsequently, the aircraft may operate in a maintaining phase in which the spacing designation has been achieved and continues. Finally, the aircraft may operate in a caution phase in which the subject aircraft was previously in the maintaining phase but has fallen out of compliance. Additional phases or scenarios may be considered and/or one or more of the described phases may be omitted. In addition to the system 100 depicted in FIG. 1, the functions described herein may also be implemented as a method carried out by the structure described above.

Based on the flight information from the FMS 122, the processing unit 110 generates display signals representing an HSI that displays various types of information associated with the current flight situation. The display signals associated with the aircraft spacing may be incorporated or included with these display signals. The display device 130 receives the display signals and renders a visual display that includes an HSI, as will now be discussed.

Figure 2:
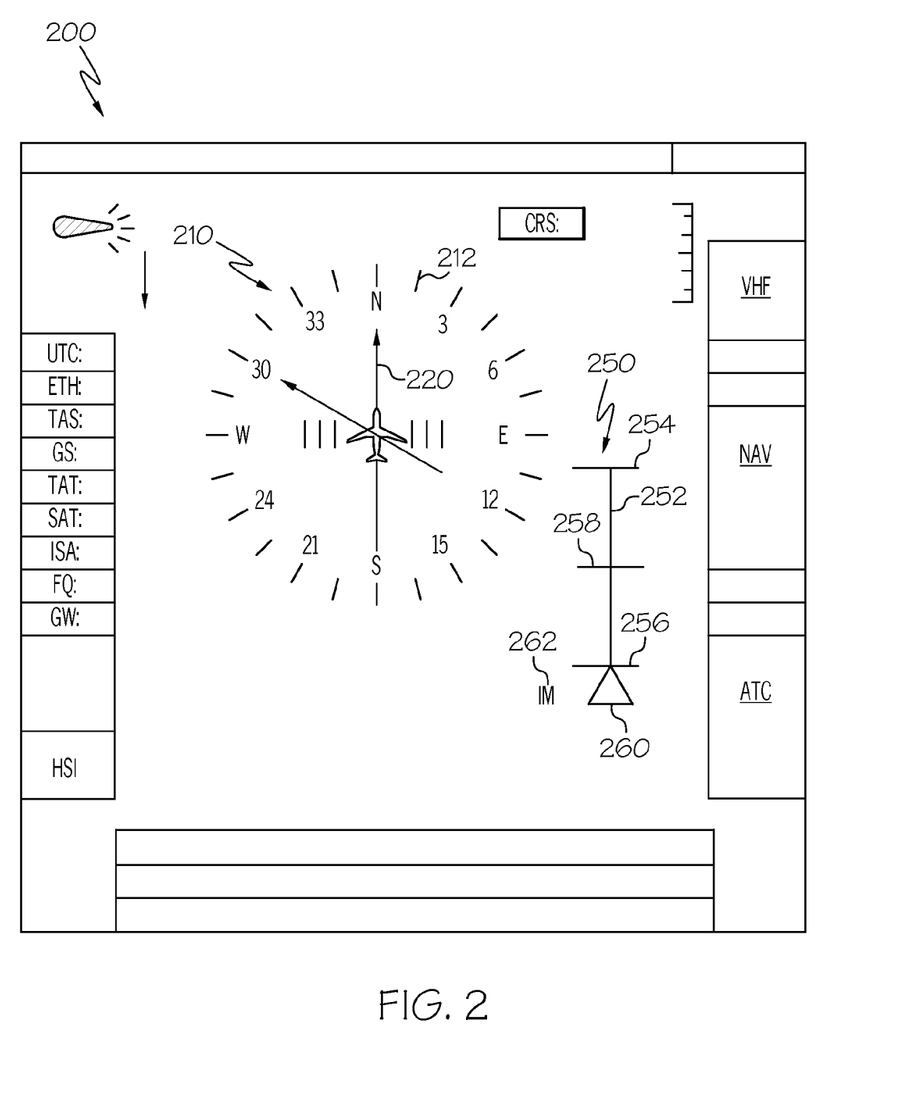
FIG. 2 is a visual display generated by the system of FIG. 1 in accordance with an exemplary embodiment.

FIG. 2 is a visual display 200 rendered by the system 100 on the display device 130 in accordance with an exemplary embodiment. FIG. 1 will be referenced below in the discussion of FIG. 2. Generally, the visual display 200 includes exemplary textual, graphical, and/or iconic information rendered by the display device 130 in response to appropriate display commands from the processing unit 110 based on data from data sources 120 and/or user input via a user interface. Although the visual display 200 discussed below is embodied as a horizontal situation indicator (HSI) display 200, other forms may be provided.

Accordingly, in the illustrated exemplary embodiment, the HSI display 200 is a dedicated HSI, and may be a digital display or an electromechanical device. In general, the HSI display 200 may be any type of display that displays the horizontal situation of the aircraft, and may include horizontal situational displays on synthetic vision systems (SVS), including perspective views, head-up displays (HUD), and/or attitude direction indicators (ADI). In this embodiment, the HSI display 200 has a compass card 210 that visually indicates an orientation of the earth's magnetic field. The compass card 210 rotates as the pilot banks the airplane away from the current direction. The compass card 210 has a number of radial measurement indicia 212 that are located along the compass perimeter. An actual heading of the aircraft is determined by the alignment of a heading indicator 220 to the radial measurement indicia 212. The compass card 210 may take a different shape, such as a linear scale. It is noted that not all of the rendered information depicted in FIG. 2 will be described, and that various other images that are not depicted in FIG. 2 (or further described) could be rendered on the HSI display 200, if needed or desired As previously mentioned, and as will now be discussed in further detail, the HSI display 200 additionally includes symbology 250 that provides information about air traffic spacing. In the depicted exemplary embodiment of FIG. 2, the spacing symbology 250 includes a linear scale 252 with hashmarks 254, 256, 258 representing tolerances 254, 256 and a target 258. The spacing symbology 250 further includes an indicator 260 and a label 262. In this exemplary embodiment, the spacing symbology 250 is positioned adjacent to the compass card 210, although other positions may be possible. Moreover, the spacing symbology 250 may take different forms from that depicted in FIG. 2. In one exemplary embodiment, the spacing symbology 250 is provided on the HSI display adjacent to the compass card 210 to provide such information in a readily recognizable location in a relatively simple manner that does not require the more detailed information on other displays, e.g., not on the navigation display, EFB, or dedicated panel. Information associated with spacing may be consulted on such displays if the symbology 250 on the HSI display 200 indicates an issue. Additional information about the symbology 250 is provided below.

Generally, the scale 252 represents the spacing designation. In particular, the target 258 is marked on the scale 252 and represents an ideal or preferred spacing position, and the scale 252 is bounded by the upper and lower tolerances 254, 256, which respectfully represent upper and lower limits of an acceptable spacing of the aircraft relative to a lead aircraft. As discussed above, the target 258 and tolerances 254, 256 may represent spacing expressed as time, distance, or another parameter. Any suitable range of tolerances 254, 256 may be provided. In the example discussed below, the predetermined range may be ±5 seconds, as one example. In one exemplary embodiment, the magnitude and unit of the tolerances 254, 256 and target 258 may form part of the symbology 250 and expressed as text or other suitable format. In other embodiments, such as the embodiment shown, such magnitudes and units are omitted to provide cleaner and simpler symbology. As shown, the target 258 is equidistant between the tolerances 254, 256, although the upper and lower tolerances 254, 256 are not necessarily the same. Generally, the tolerances 254, 256 may be established as part of the spacing information provided by, for example, air traffic control, and/or by regulation or protocol.

The indicator 260 is positioned relative to the scale 252 to indicate the current spacing performance of the aircraft. As noted above, the system 100 evaluates the current position of the aircraft relative to the lead aircraft and the spacing designation. The system 100 then compares the relative position to the spacing designation, and the indicator 260 represents this comparison as a position relative to the tolerances 254, 256 and target 258.

As previously noted, the upper tolerance 254 represents the most forward position of the aircraft relative to the lead aircraft. In other words, if the indicator 260 is positioned on the upper tolerance 254, the aircraft is considered 5 seconds (or other specified range) too close to the lead aircraft relative to the spacing target 258, although within the accepted range. However, if beyond the upper tolerance 254, the aircraft is too close to the lead aircraft. Similarly, the lower tolerance 256 represents the most rearward position of the aircraft relative to the lead aircraft. In other words, if the indicator 260 is positioned on the lower tolerance 256, the aircraft is considered 5 seconds (or other specified range) too far away from the lead aircraft relative to the spacing target 258, although within the accepted range. If beyond the lower tolerance 256, the aircraft is too far away from the lead aircraft. As such, the tolerances 254, 256 represent an acceptable spacing window or cushion between the aircraft and the lead aircraft, and the indicator 260 provides the current performance of the aircraft relative to those tolerances 254, 256 and the particular target 258.

The indicator 260 may further provide information regarding the trend or the direction of the rate of change of the spacing performance and/or status. For example, in the scenario depicted in FIG. 2, the indicator 260 is embodied as an arrow (or triangle) that references a particular direction. The point or apex of the indicator 260 on the scale 252 indicates whether or not the spacing performance relative to the tolerances 254, 256 and target 258 is increasing or decreasing. If the indicator 260 is pointing upward, as in FIG. 2, the aircraft is approaching the lead aircraft, e.g., the spacing status between the two aircraft is decreasing, and thus, the spacing performance is improving as the indicator 260 approaches the lower tolerance 256 and target 258. If the indicator 260 is pointed downward, as discussed below, the aircraft is separating from the lead aircraft, e.g., the spacing status between the two aircraft would be increasing, and thus, the spacing performance would be deteriorating as the indicator 260 moves away from the lower tolerance 256 and target 258. In some situations, particularly when the spacing target is achieved, the directionality of the indicator 260 may be neutralized, e.g., represented with something other than an up or down triangle. The indicator 260 may represent a trend over any suitable amount of time. Additional information is provided below.

The label 262 may represent a number of different types of information. For example, the label 262 may provide an identifier of the spacing symbology 250 relative to other symbology on the HSI display 200. In other examples, the label 262 may indicate that the spacing function is active and/or provide an indication of the spacing phase, described below. In the depicted exemplary embodiment, the label 262 is "IM", representing that that the symbology 250 is associated with spacing (or interval management).

As introduced above, the system 100 may operate in one or more phases, and as such, the symbology 250 may represent these phases. As examples, the phase of the operation may be represented by changes in color, as text, and/or by other distinguishing characteristics. In the scenario depicted by FIG. 2, the symbology 250 represents that the system 100 is operating in the achieving mode. As noted above, the achieving mode is a phase in which the aircraft has not yet achieved the spacing designation, but the aircraft is attempting to achieve the spacing designation. In this exemplary embodiment, the phase is indicated by the color of the symbology 250. For example, the indicator 260 and label 262 may be rendered in cyan to represent the achieving phase. In other embodiments, the phase may be indicated in text, such as by an "A" within the symbology 250.

As also noted above, the system 100 continuously tracks the flight situation of the lead aircraft and the subject aircraft and any updated spacing information. As such, the symbology 250 may be updated to reflect new information and situations, as appropriate.

Accordingly, based on the spacing symbology 250, the pilot may take action to comply or maintain compliance with spacing requirements. For example, by correctly manipulating throttle/power and/or the flight path, the pilot may achieve the spacing designation, although these actions may be tempered or accelerated by the trend or magnitude of any spacing discrepancies. The symbology 250 may assist the pilot with these actions.

Additional depictions of the symbology 250 in further scenarios are discussed below with reference to FIGS. 3-9. FIGS. 3-9 are representations of the symbology 250 removed from the HSI display 200 of FIG. 2. As noted above, such symbology 250 is typically provided as part of the HSI display 200.

Figure 3:
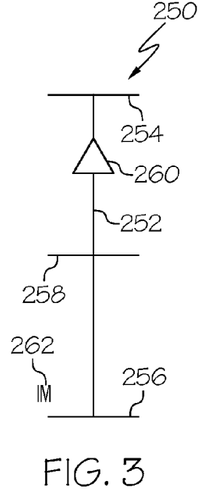
FIGS. 3-9 are representations of spacing symbology for the display of FIG. 2 in accordance with exemplary embodiments.
Figure 4:
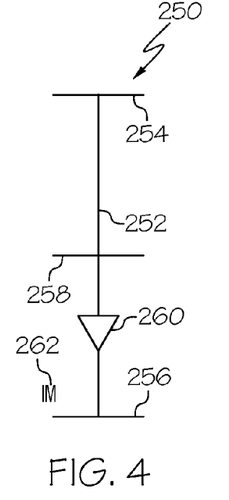
Figure 5:
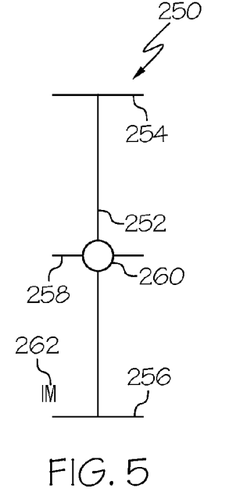

FIGS. 3-5 depict the symbology 250 in the maintaining phase. As noted above, the maintaining phase is appropriate when the aircraft has achieved the spacing designation. In some embodiments, the maintaining phase may be represented by rendering portions of the symbology 250 in a particular color, such as the indicator 260 and the label 262 in green. In other embodiments, the phase may be indicated in text, such as by an "M" within the symbology 250.

FIGS. 3 and 4 also depict the performance trend of the aircraft relative to the spacing designation. In particular, indicator 260 in FIG. 3 is pointing upwards, thereby representing that the spacing between the aircraft and the lead aircraft is decreasing. The indicator 260 in FIG. 4 is pointing downward, thereby representing that the spacing between the aircraft and the lead aircraft is increasing. In FIG. 5, the indicator 260 is embodied as a circle to replace the arrow of FIGS. 3 and 4. Generally, the indicator 260 may appear as a circle when the indicator 260 is on the target 258 (e.g., when the aircraft has achieved the spacing target).

FIGS. 6-9 depict the symbology 250 in the caution phase. As noted above, the caution phase is appropriate when the aircraft has previously achieved the spacing designation but has fallen outside of acceptable tolerances. In some embodiments, the caution phase may be represented by rendering portions of the symbology 250 in a particular color, such as the indicator 260 and the label 262 in amber. In other embodiments, the phase may be indicated in text, such as by a "C" within the symbology 250. In some exemplary embodiments, the caution phase may initiate additional actions, including visual and/or audible warnings.

Figure 6:
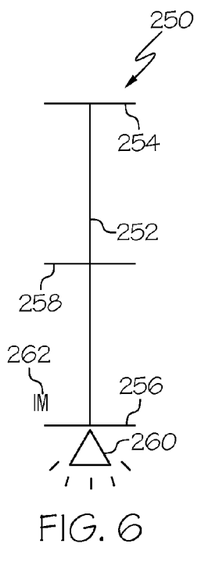
Figure 7:
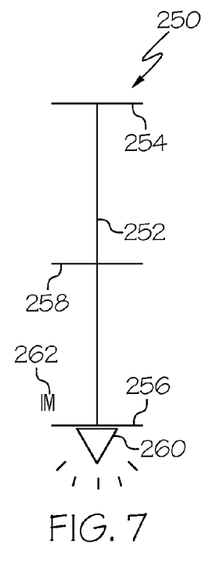

As above, FIGS. 6-9 also depict the performance trend of the aircraft relative to the spacing designation. In FIGS. 6 and 7, the aircraft is too far behind the lead aircraft, represented by the indicator 260 positioned outside of (e.g., below) the lower tolerance 256. In FIG. 6, the indicator 260 is pointing up, thereby indicating that the aircraft is approaching the lead aircraft and is closer to achieving the lower tolerance 256. In FIG. 7, the indicator 260 is pointing down, thereby indicating that the aircraft is further separating from the lead aircraft and is moving further way from achieving the lower tolerance 256.

Figure 8:
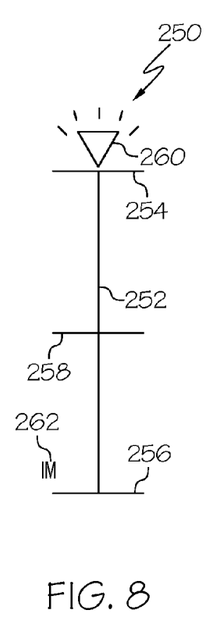
Figure 9:
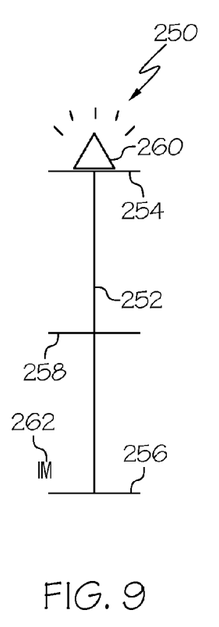

In FIGS. 8 and 9, the aircraft is too close to the lead aircraft, represented by the indicator 260 positioned outside of (e.g., above) the upper tolerance 254. In FIG. 8, the indicator 260 is pointing down, thereby indicating that the aircraft is moving away from the lead aircraft and is closer to achieving the upper tolerance 254. In FIG. 9, the indicator 260 is pointing up, thereby indicating that the aircraft is approaching the lead aircraft and is moving further way from achieving the upper tolerance 254.

Accordingly, exemplary embodiments discussed herein provide improved spacing information to the pilot of an aircraft. Such information is represented as symbology in an intuitive and convenient manner, particularly as part of an HSI, that does not obscure other visual elements provided to the pilot. The improved symbology and associated functionality enable enhanced air traffic management in air space environments, such as busy airports to allow aircraft to follow one another at a controlled and monitored spacing to increase air space capacity and efficiency.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for a subject aircraft, comprising:
a processing unit configured to receive air traffic spacing information associated with a lead aircraft and flight information associated with the subject aircraft and to generate display signals associated with the air traffic spacing information and the flight information,
wherein the air traffic spacing information includes a spacing designation of the subject aircraft relative to the lead aircraft and a lead current position of the lead aircraft, wherein the spacing designation includes a spacing target, a first spacing tolerance, and a second spacing tolerance, wherein the flight information includes a subject current position of the subject aircraft, and
wherein the processing unit is configured to compare the subject current position to the lead current position to generate a spacing status and to compare the spacing status to the spacing designation to generate a spacing performance; and
a display unit coupled to the processing unit and configured to receive the display signals from the processing unit and to render a horizontal situation indicator with spacing symbology based on the air traffic spacing information and the flight information,
wherein the spacing symbology includes a linear scale, the spacing target positioned on the linear scale, an indicator positioned on the linear scale relative to the spacing target to indicate the spacing performance of the subject aircraft relative to the spacing target, the first spacing tolerance positioned on the linear scale, and the second spacing tolerance positioned on the linear scale.

2. The display system of claim 1, wherein the processing unit is configured to determine a spacing trend based the spacing status over time, and wherein the indicator of the spacing symbology represents the spacing trend when the indicator is offset from the spacing target.

3. The display system of claim 2, wherein the indicator of the status symbology is a triangle with an apex oriented in a direction representing the spacing trend relative to the spacing target when the indicator is offset from the spacing target, and wherein the indicator of the status symbology is a circle when the indicator is on the spacing target.

4. The display system of claim 1, wherein the processing unit is configured to operate in a maintaining phase when the spacing status complies with the spacing designation and in a caution phase when the spacing status is out of compliance with the spacing designation.

5. The display system of claim 4, wherein at least a portion of the spacing symbology is rendered in a first color during the maintaining phase and in a second color during the caution phase, the first color being different from the second color.

6. The display system of claim 1, further comprising a communication system for receiving the air traffic spacing information from an air traffic controller.

7. The display system of claim 1, wherein horizontal situation indicator includes a compass card and a heading indicator positioned relative to the compass card to indicate a heading of the subject aircraft, the spacing symbology being positioned proximate to the compass card.

8. A method for displaying air traffic spacing information for a subject aircraft, the method comprising the steps of:
   receiving the air traffic spacing information, the air traffic spacing information being associated with a lead aircraft relative to the subject aircraft and including a spacing designation and a lead current position of the lead aircraft;
   comparing the lead current position of the lead aircraft to a subject current position of the subject aircraft to determine a spacing status;
   comparing the spacing status to the spacing designation to determine a spacing performance; and
   generating a horizontal situation indicator on a display device, the horizontal situation indicator including spacing symbology representing the spacing performance,
   wherein the generating step includes displaying the spacing symbology with a linear scale and a spacing target positioned on the linear scale, displaying the spacing symbology with an indicator positioned on the linear scale relative to the spacing target to indicate the spacing performance of the subject aircraft relative to the spacing target, and displaying the spacing symbology with a first spacing tolerance and a second spacing tolerance positioned on the linear scale.

9. The method of claim 8, further comprising determining a spacing trend based the spacing status over time, and wherein the generating step includes displaying the spacing trend.

10. The method of claim 8, further comprising operating in a maintaining phase when the spacing status complies with the spacing designation and operating in a caution phase when the spacing status is out of compliance with the spacing designation.

11. The method of claim 10, wherein the generating step includes displaying the spacing symbology in a first color during the maintaining phase and in a second color during the caution phase, the first color being different from the second color.

12. The method of claim 8, wherein the generating step includes displaying the horizontal situation indicator with a compass card and a heading indicator positioned relative to the compass card to indicate a heading of the subject aircraft, the spacing symbology being positioned proximate to the compass card.

* * * * *